United States Patent
Wataya

(10) Patent No.: US 6,646,764 B1
(45) Date of Patent: Nov. 11, 2003

(54) PRINTING SYSTEM TO OUTPUT A DOCUMENT COMBINING IMAGE DATA WITH DATA THAT IDENTIFIES A SOURCE OF THE IMAGE AND A PRINTER

(75) Inventor: Masafumi Wataya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/357,856

(22) Filed: Jul. 21, 1999

(30) Foreign Application Priority Data

Jul. 31, 1998 (JP) .......................................... 10-218173

(51) Int. Cl.[7] .......................... G06F 13/00; G06F 3/12; G06K 15/02
(52) U.S. Cl. ........................ 358/3.28; 347/21; 347/74; 347/84; 347/117; 283/17; 283/73; 283/74; 283/113; 283/114
(58) Field of Search ........................ 358/3.28; 347/117, 347/21, 84, 20, 101; 283/17, 73, 74, 113, 114; 380/51

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,723,129 A | 2/1988 | Endo et al. |
| 4,740,796 A | 4/1988 | Endo et al. |
| 5,257,119 A | * 10/1993 | Funada et al. .............. 358/438 |
| 5,707,082 A | * 1/1998 | Murphy ....................... 283/67 |
| 5,857,038 A | * 1/1999 | Owada et al. .............. 382/284 |
| 6,072,871 A | * 6/2000 | Ur ................................. 380/51 |
| 6,285,776 B1 | * 9/2001 | Rhoads ....................... 382/100 |

FOREIGN PATENT DOCUMENTS

| | | |
|---|---|---|
| JP | 54-056847 | 5/1979 |
| JP | 59-123670 | 7/1984 |
| JP | 59-138461 | 8/1984 |
| JP | 60-71260 | 4/1985 |
| JP | 6-326854 | 11/1994 |
| JP | 7-047717 | 2/1995 |
| JP | 7-177361 | 7/1995 |
| JP | 10-145584 | 5/1998 |

* cited by examiner

Primary Examiner—Edward Coles
Assistant Examiner—Alan Rahimi
(74) Attorney, Agent, or Firm—Fitzpatrick, Cella, Harper & Scinto

(57) ABSTRACT

Disclosed is a printing system in which unauthorized copying and reproduction are prevented by making it easy to identify the source which created or manipulated image data to be reproduced and outputted. In accordance with this printing system, image data is entered from a personal computer that generates the image data, attribute information concerning the personal computer and a printer for forming an image is acquired, identification information which specifies the personal computer and the printer is generated based upon the attribute information, this identification information is added to the image data, and an image is printed using the image data to which the identification information has been added.

31 Claims, 13 Drawing Sheets

PRINTING SYSTEM TO OUTPUT A DOCUMENT COMBINING IMAGE DATA WITH DATA THAT IDENTIFIES A SOURCE OF THE IMAGE AND A PRINTER

BACKGROUND OF THE INVENTION

This invention relates to a printing system and, more particularly, to a printing system in which it is possible to prevent counterfeiting and unauthorized copying.

Techniques have been developed for the purpose of preventing the counterfeiting of banknotes, securities and the like by a stand-alone apparatus such as a color copier which performs operations from reading in of an image document to outputting of the reproduced image.

However, it is now becoming possible to execute highly sophisticated image duplication processing such as the counterfeiting of banknotes without using a stand-alone image duplicating apparatus such as a color copier. The reason for this is the development in recent years of computer systems and image-data input/output peripherals such as scanner/printers and the development of image processing software for editing and manipulating the input/output image data.

Furthermore, it has recently become possible to send and receive image data easily via various networks typified by the Internet and LANs such as the Ethernet. As a result, it has also become possible to send image data created and edited or manipulated in a certain apparatus to a remote color printer via a network and print out an image from this printer.

In addition, by simply transferring data via a network, it is possible with the development of computer networks not only to counterfeit banknotes and securities but also to reproduce content that includes images such as photographs and video character animations. This means that it is becoming more difficult to eliminate acts that infringe upon copyrights, trademarks and the right of likeness.

Against this background there have been proposed a variety of techniques to prevent not only the counterfeiting of banknotes and securities but also the unlawful copying of specific images. Typical examples of such techniques have been disclosed in the specifications of Japanese Patent Application Laid-Open (KOKAI) Nos. 6-326854, 7-177361, 7-47717 and 10-145584.

However, the examples of the prior art mentioned above involve a number of problems.

In the case of the art disclosed in the specification of Japanese Patent Application Laid-Open No. 6-326854, for example, means for inputting identification information relating to external equipment is required. This makes it impossible to deal with external equipment not associated with an input of such information. In the case of the art disclosed in the specification of Japanese Patent Application Laid-Open No. 7-177361, image data for printing purposes is received if there is agreement with encrypted information. This makes it difficult to support systems other than systems which comprise predetermined components.

Thus, with the examples of the prior art, it is difficult to deal with a system environment in which a number of unspecified devices can be utilized by a number of unspecified individuals. For example, in a case where an individual who has created or manipulated image data outputs the image using a shared printer in a network system in which a plurality of devices are interconnected via a network, it is very difficult to identify an individual who copied or reproduced an image without authorization. Further, in a situation where another person's printer is connected to one's own personal computer, even without the intermediary of a network, and an image is printed out using the image data, it is similarly very difficult to identify an individual who has committed an unauthorized act.

In the case of the technique disclosed in the specification of Japanese Patent Application Laid-Open No. 7-47717, a printer proper is provided with a function for discriminating items whose counterfeiting is to be prevented. This entails a printer of high cost and runs counter to the trend to produce printers of lower cost. Furthermore, in the case of the technique disclosed in the specification of Japanese Patent Application Laid-Open 10-145584, a host computer adds on attribute data concerning an external device and outputs the attribute data to a printer. Whether or not the data added on will be reproduced by the printer, therefore, depends greatly upon the reproduction capability of the printer. Accordingly, depending upon the image reproduction capability of the printer, there are instances where absolutely no effect is obtained.

Thus, other problems encountered with the prior art include equipment cost and difficulty in preventing unauthorized copying and reproduction in terms of equipment capability.

SUMMARY OF THE INVENTION

According, it is an object of the present invention to provide a printing system in which unauthorized copying and reproduction are prevented by making it easy to identify the source which created or manipulated image data to be reproduced and output, a printing apparatus used in this system, an apparatus identifying method for identifying an apparatus that is the source of image data creation or manipulation, and a computer-executable program for implementing this method.

According to one aspect of the present invention, the foregoing object is attained by providing a printing system having a generating apparatus for generating image data and a forming apparatus for forming an image based upon the image data, the system comprising: input means for inputting the image data outputted from the generating apparatus; acquisition means for acquiring attribute information relating to the generating apparatus and the forming apparatus; identification-information generating means for generating identification information, which identifies the generating apparatus and the forming apparatus, based upon the attribute information; adding means for adding the image data to the identification information; and output means for outputting the image data, to which the identification information has been added by the adding means, to the forming apparatus.

The generating apparatus preferably includes at least one of an image input unit such as a scanner for reading an image original, an external information processing unit connected by a network such as a LAN or public communication line, a host computer for generating the image data by executing software, and a large-capacity information storage device for storing the image data. To accomplish this, the system is preferably provided with communication means for communicating with the network.

The forming apparatus, on the other hand, is a printer having a printhead which performs printing in accordance with an ink-jet method. The printhead preferably has an electrothermal transducer for generating thermal energy applied to ink in order to discharge the ink by utilizing thermal energy. Further, in order to perform color printing, the printhead preferably includes a first head for discharging black ink, a second head for discharging cyan ink, a third head for discharging magenta ink and a fourth head for discharging yellow ink.

The printhead may be further provided with a fifth head for discharging processed liquid for enhancing water repellency of an image that has been printed on a printing medium.

It is preferred that the output means be adapted so as to output the image data, to which the identification information has been added by the adding means, to the forming apparatus when printing is performed by the fourth head.

The adding means may add a pattern, which has been obtained by encrypting the identification information, to the image data on the basis of the identification information.

Further, on the basis of the image data to which the identification information output by the output means has been added, the generating apparatus may print a pattern that represents this identification information at a predetermined position on the printing medium.

Further, the acquisition means preferably includes storage means for temporarily storing attribute information such as manufacturer's serial numbers of the generating apparatus and forming apparatus, registration numbers of software used in the printing system and identification numbers of system users.

According to another aspect of the present invention, the foregoing object is attained by providing a printing apparatus for printing an image on a printing medium based upon image data that is inputted from a generating apparatus which generates the image data, the apparatus comprising: acquisition means for acquiring attribute information relating to the generating apparatus and the printing apparatus; identification-information generating means for generating identification information, which identifies the generating apparatus and the printing apparatus, based upon the attribute information; adding means for adding the image data to the identification information; and printing means for printing an image on the printing medium based upon the image data to which the identification information has been added by the adding means.

According to still another aspect of the present invention, the foregoing object is attained by providing an apparatus identifying method for identifying a generating apparatus which generates image data and a forming apparatus which forms an image based upon the image data, the method comprising: an input step of inputting the image, data outputted from the generating apparatus; an acquisition step of acquiring attribute information relating to the generating apparatus and the forming apparatus; an identification-information generating step of generating identification information, which identifies the generating apparatus and the forming apparatus, based upon the attribute information; an adding step of adding the image data to the identification information; an output step of outputting the image data, to which the identification information has been added by the adding step, to the forming apparatus; and a printing step of printing an image on a printing medium based upon the image data outputted from the output step.

According to still another aspect of the present invention, the foregoing object is attained by providing a computer program product, stored in a computer-readable storage medium, to be executed in a computer for identifying a generating apparatus which generates an image and a forming apparatus which forms an image based upon the image data, the product comprising: code for executing processing for inputting the image data outputted from the generating apparatus; code for executing processing for acquiring attribute information relating to the generating apparatus and the forming apparatus; code for executing processing for generating identification information, which identifies the generating apparatus and the forming apparatus, based upon the attribute information; code for executing processing for adding the image data to the identification information; code for executing processing for outputting the image data, to which the identification information has been added by the adding processing, to the forming apparatus; and code for executing processing for causing the forming apparatus to print an image on a printing medium based upon the image data to which the identification information has been added.

In accordance with the present invention as described above, image data is entered from a generating apparatus that generates the image data, attribute information concerning the generating apparatus and a forming apparatus that forms an image is acquired, identification information which specifies the generating apparatus and the forming apparatus is generated based upon the attribute information, this identification information is added to the image data, and the image data to which the identification information has been added is output to the forming apparatus.

The invention is particularly advantageous since a generating apparatus or forming apparatus that was used in counterfeiting can be readily identified from the image that has been formed.

In particular, information identifying various items of equipment used in counterfeiting, such as a generating apparatus and forming apparatus, is acquired as attribute information in the image forming process and identification information identifying these items of equipment is generated based upon this attribute information. As a result, regardless of the equipment being used in the system, information identifying this equipment is obtained. This is advantageous in that it is possible to take measures to prevent counterfeiting even in a system to which a large number of unspecified items of equipment and devices are connected.

Furthermore, the identification information is added on at such time that the image data to be printed is output to the forming apparatus, such as a printer. This makes it possible to add on information according to the individual image reproducing capabilities of forming apparatus. This makes possible application to forming apparatus of any type.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram showing an example in which a printed black line is a position at which a pattern of identification information is added on;

FIG. 11 is a diagram showing another different example of positions at which an identification-information pattern is added on;

DESCRIPTION OF THE PREFERRED EMBODIMENTS

Preferred embodiments of the present invention will now be described in detail in accordance with the accompanying drawings.

Figure 1:
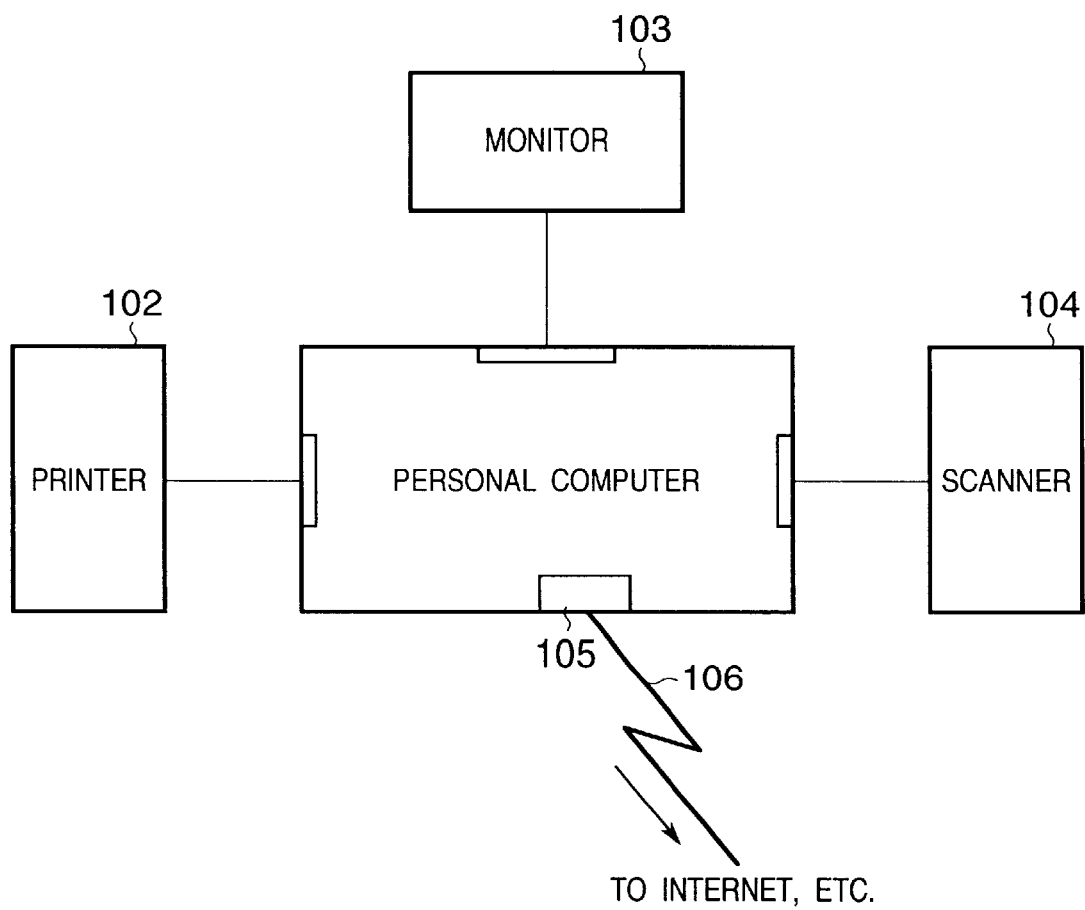
FIG. 1 is a block diagram illustrating the configuration of an image processing system which is a typical embodiment of the present invention.

FIG. 1 is a block diagram illustrating the configuration of an image processing system which is a typical embodiment of the present invention.

The system shown in FIG. 1 includes a personal computer 101 equipped with a high-performance processor capable of executing image processing; a printer 102 for printing a color image in accordance with an ink-jet method; a monitor 103 connected to the personal computer 101; a scanner 104 for capturing an image document and generating image data; a modem 105 for sending and receiving various information inclusive of image data to and from an external device via a communication line; and a public communications line 106 for connecting the personal computer 101 to the Internet.

Figure 2:
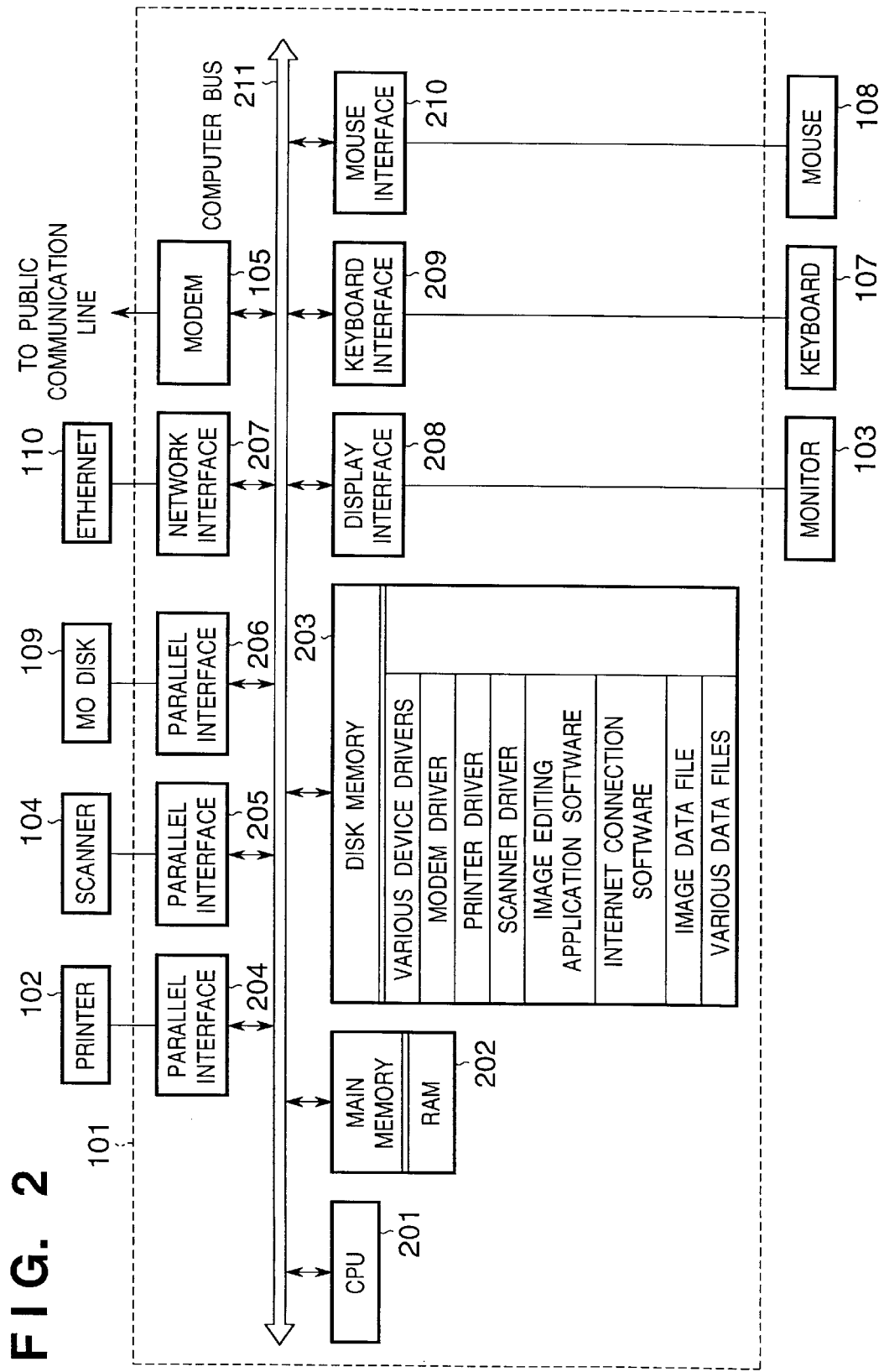
FIG. 2 is a block diagram showing the details of construction of a personal computer 101.

FIG. 2 is a block diagram showing the details of the construction of the personal computer 101.

As shown in FIG. 2, the personal computer 101 includes a CPU 201 which controls the operation of the personal computer 101 and processes various information such as image information, a RAM 202 which performs the function of a main memory, and a disk memory (referred to as a "disk" below) 203 capable of storing a large quantity of information. Stored on the disk 203 is an operating system as well as various device drivers, a modem driver, a printer driver, a scanner driver, software such as image editing application software and Internet connection software, an image data file and various data files, etc., as shown in FIG. 2.

Connected to the personal computer 101 in addition to the peripherals shown in FIG. 1 are a keyboard 107, a mouse 108, an MO (magneto-optical) disk 109, which is one type of external storage device, and an Ethernet adapter 110. The MO disk 109 makes it possible to store a large quantity of image data captured from another information processing system. Examples of other information processing systems are a system connected to an Ethernet LAN via the Ethernet adapter, and a system connected to the Internet via the public communications line 106. Thus, the personal computer 101 can obtain image data from these systems.

The personal computer 101 is further equipped with parallel interfaces 204–206 for connecting the above-mentioned various peripherals, a network interface 207, a display interface 208, a keyboard interface 209 and a mouse interface 210. These interfaces are connected to the CPU 201, main memory 202, disk 203 and modem 105 by a computer bus 211.

Stored on the disk 203 is various information such as the manufacturer serial numbers of the personal computer 101, printer 102, scanner 104 and MO disk 109, the registration ID number of the operating system, the registration ID numbers of the device drivers, the registration ID number of image editing application software, the creation dates of image data files and the registration ID numbers of system users. If counterfeiting has occurred, this information makes it possible to identify the system environment in which counterfeiting took place as well as the date thereof. The system used in the counterfeiting and the counterfeiter can be identifed based upon this information.

The printer driver stored on the disk 203 decides or acquires these items of information as various attributes via the CPU 201 and sends this information to the printer 102 before sending the image information. The details will be described below with reference to the drawings.

An image that is the target of counterfeiting is highly likely to be captured using any of several methods such as use of the scanner 104, MO disk 206, Ethernet LAN or Internet, etc. The registration IDs of these items of equipment and of the drivers of the devices that allow communication with networks, as well as the network IDs, are useful information for the purpose of identifying counterfeiters and systems.

Figure 3:
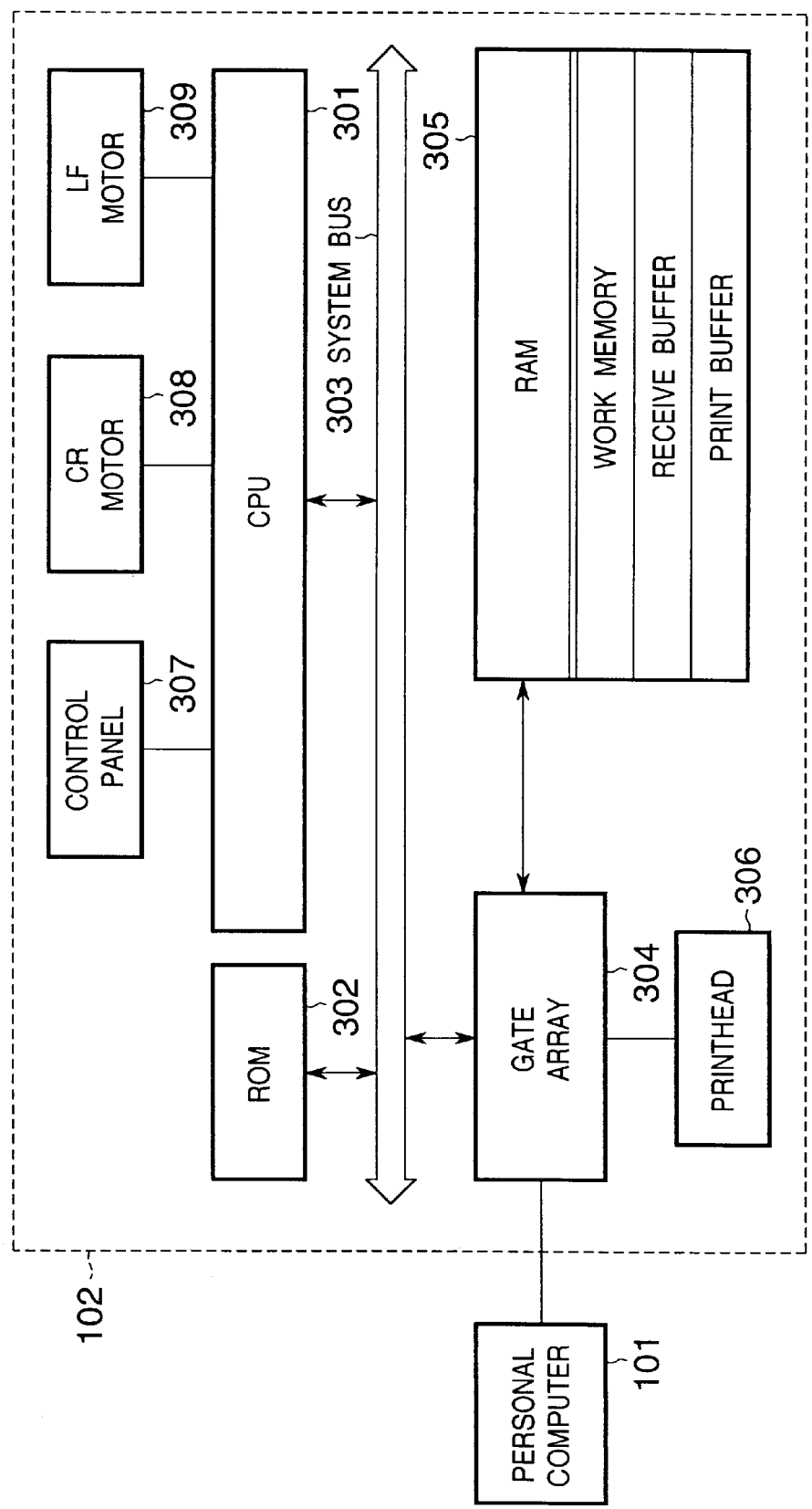
FIG. 3 is a block diagram showing the details of construction of a printer 102.

FIG. 3 is a block diagram illustrating the details of construction of the printer 102.

As shown in FIG. 3, the printer 102 includes a CPU 301 for controlling the overall printer; a ROM 302 storing a control program that defines operation of the CPU; a system bus 303;, a gate array (G.A.) 304 for interfacing the personal computer 101, implementing arithmetic functions necessary to carry out print data processing and other types of printing and controlling drive of the printhead; a RAM 305 used as a work area when the CPU 301 executes various control operations, a receive buffer for temporarily storing data from an interface, and a print buffer for temporarily storing data output to a printhead 306. The printhead 306 performs color printing in accordance with an ink-jet method, by way of example.

The printer 102 further includes a control panel 307 having keys for entering various commands to the printer 102, and an LCD or LED lamps for notifying the user of various messages from the printer 102 and of the status of operation; a carriage (CR) motor 308 for moving a carriage (not shown), which carries the printhead 306, back and forth; and a line-feed (LF) motor 309 used to transport a print medium such as printing paper.

Figure 4:
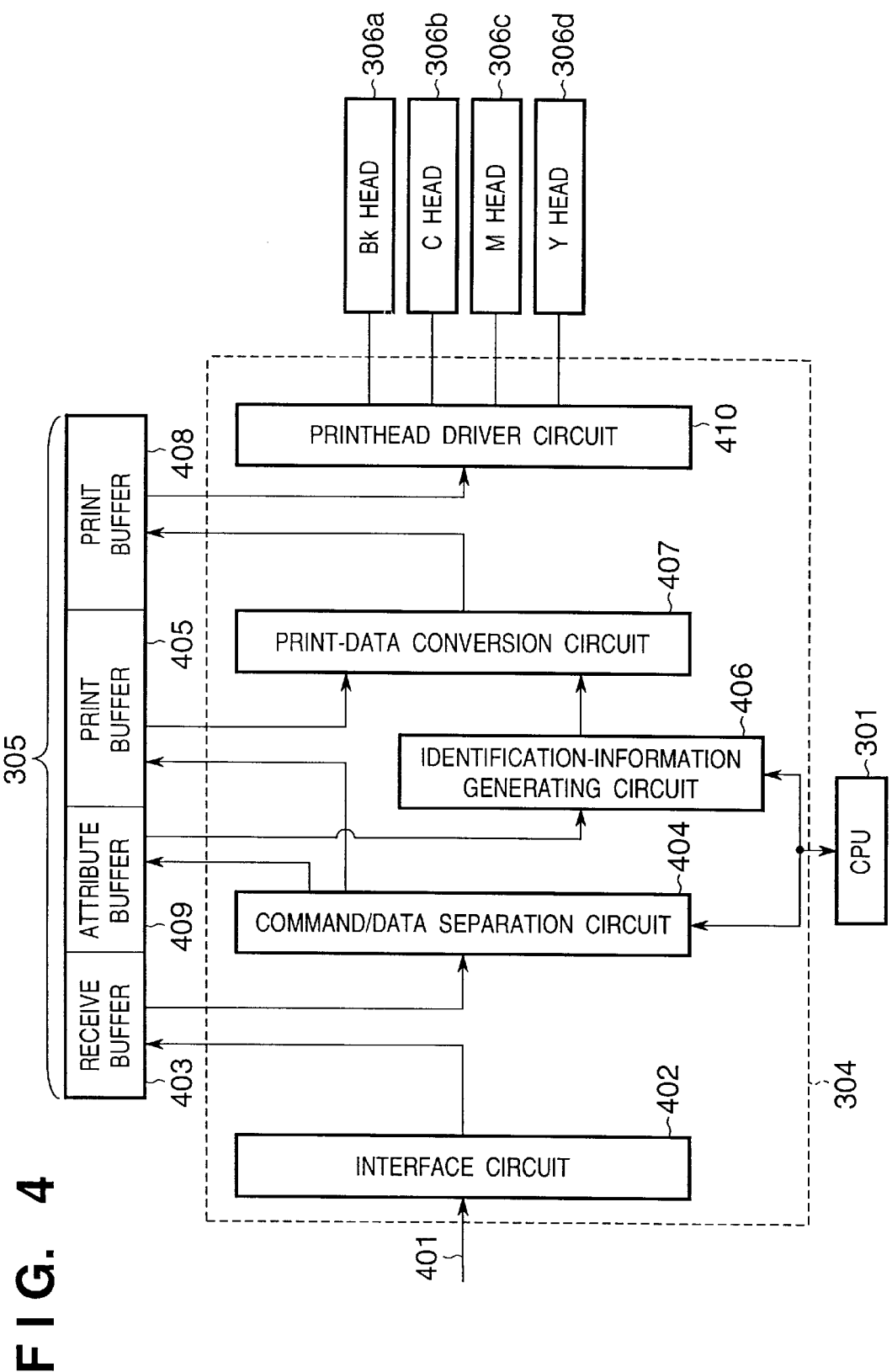
FIG. 4 is a block diagram schematically illustrating the flow of processing of print information executed by the printer 102.

FIG. 4 is a block diagram schematically illustrating the flow of processing of print information executed by the printer 102.

As shown in FIG. 4, print information input from an interface line 401 to an interface circuit 402, which is in compliance with IEEE 1284 and provided in the gate array (G.A.) 304, is stored in a receive buffer 403 defined within the RAM 305. Next, under control by the CPU 301, print information that has been stored in the receive buffer 403 is read out and is then separated into a command [a printer control command and attribute information (e.g., manufacturer's serial number and user ID of the personal computer) of the personal computer 101] and data by a command/data separation circuit 404 constituted by a selector and several registers. The information stored in the registers is analyzed by the CPU 301.

The attribute information obtained as a result of the foregoing operation is stored in an attribute buffer 409. Meanwhile, on the basis of this attribute information, an identification-information generating circuit 406 constituted by several registers generates identification information which identifies the apparatus that generated the print information and the apparatus that prints the image. This identification information is generated as a result of analysis, performed by the CPU 301, of the information that has been stored in these registers.

The separated data is stored in a print buffer 405.

Next, a print-data conversion circuit 407 constituted by a combination of logic gates reads out the data that has been stored in the print buffer 405 and, on the basis of the output from the identification-information generating circuit 406, converts this to print data and stores the print data in the print buffer 408.

Finally, a printhead driver circuit 410 reads out the print data that has been stored in the print buffer 408 and transfers this data to the four head units constructing the printhead 306, namely a Bk head 306a for discharging black (Bk) ink, a C head 306b for discharging cyan (C) ink, an M head 306c for discharging magenta (M) ink, and a Y head 306d for discharging yellow (Y) ink.

The operation of the image processing system constructed as set forth will now be described.

Figure 5:
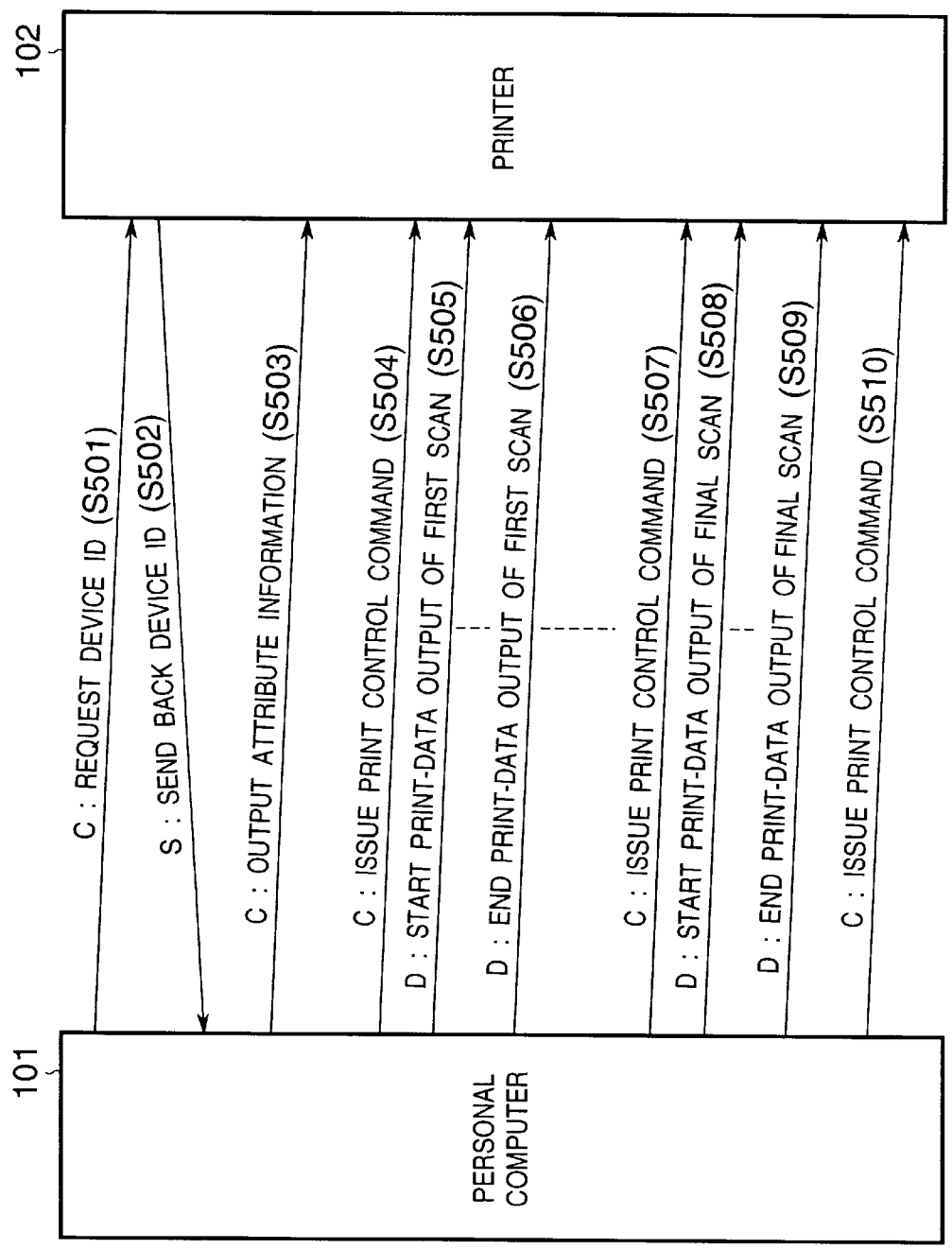
FIG. 5 is a diagram showing the relationship of data exchange between the personal computer 101 and the printer 102.
Figure 6:
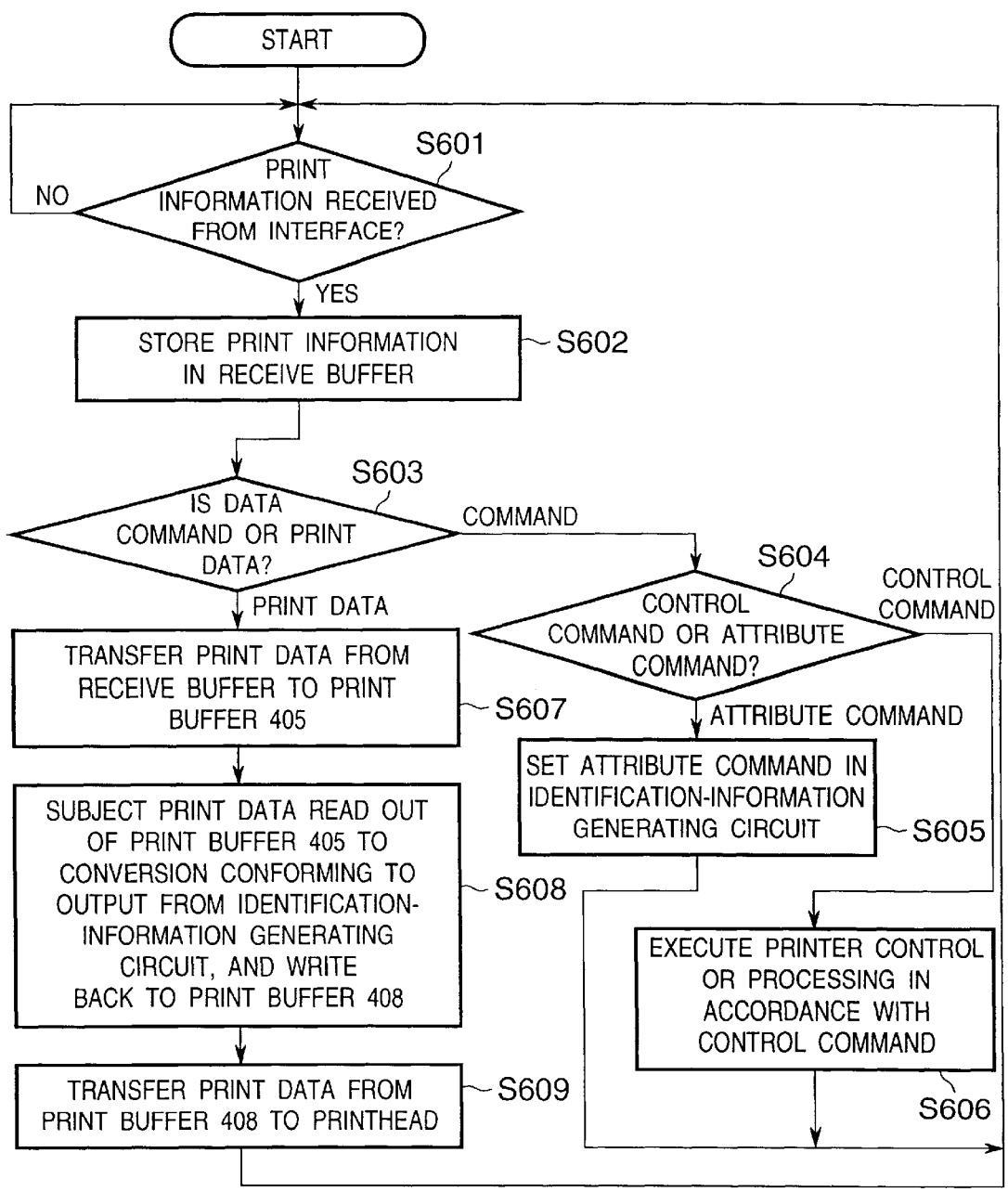
FIG. 6 is a flowchart illustrating print information processing executed by the printer 102.

FIG. 5 is a diagram showing the data exchange relationship between the personal computer 101 and printer 102, and FIG. 6 is a flowchart illustrating print information processing executed by the printer 102.

As shown at step S501 in FIG. 5, first the personal computer 101 requests the printer 102 for the printer device ID via the interface circuit 402. As shown at S502 in FIG. 5, the printer 102 responds by sending its own device ID back to the personal computer 101 via the interface circuit 402. When device verification between the personal computer and printer is thus completed, processing shifts to transfer of print information.

Next, as indicated at S503 in FIG. 5, the personal computer 101 transmits print information inclusive of attribute information via the interface circuit 402. As mentioned above, this information is stored temporarily in the receive buffer 403 and the CPU 301 executes control in such a manner that the stored print information is sequentially read out, the attribute information is separated by the command/data separation circuit 404 and is stored in the attribute buffer 409. Then, as indicated at S504 in FIG. 5, the personal computer 101 sends the printer 102 a print control command defining the printing mode, etc., after which the personal computer 101 sends print data in conformity with scanning of the printhead 306, as indicated at S505, S506 in FIG. 5.

Issuance of the print control command and output of the print data is executed repeatedly every scan of the printhead 306, as indicated at steps S504 to S509 in FIG. 5. This continues until the final scan of the printhead 306. Finally, as indicated at S510 in FIG. 5, a print control command indicating end of the printing operation is sent from the personal computer 101 to the printer 102, thereby terminating a series of printing operations.

The process (S503 to S510 in FIG. 5) set forth above will now be described with reference to the flowchart shown in FIG. 6.

Receipt of print information via the interface circuit 402 is awaited at step S601. When the information is received, control proceeds to step S602, at which the received information is stored in the receive buffer 403. Next, at step S603, it is determined whether this received information is a command (inclusive of attribute information) or print data. Control proceeds to step S604 if the received information is a command and to step S607 if the received information is print data. At this stage the print data is separated by the command/data separation circuit 404, as mentioned above.

Whether the received command is a control command or an attribute command is discriminated at step S604. If the command is an attribute command (corresponding to S503 in FIG. 5, for example), control proceeds to step S605, where the attribute command is set in the register of the identification-information generating circuit 406 and stored in the attribute buffer 409. Control then returns to step S601, where the system waits for receipt of the next item of print information. If the command is a control command (corresponding to step S504, S507 or S510 in FIG. 5, for example), on the other hand, then proceeds to step S606, where control or processing conforming to this command is executed. Control then returns to step S601, where the system waits for receipt of the next item of print information.

If it is determined at the processing of step S603 that the received information is print data, then the print data is transferred from the receive buffer 403 to the print buffer 405 via the command/data separation circuit 404 at step S607.

This is followed by step S608, at which the print data that has been read out of the print buffer 405 is input to the print-data conversion circuit 407 and the CPU monitors whether or not the printing position of the printhead 306 has reached a predetermined position. If the printing position has reached the predetermined position, the CPU 301 reads the attribute information out of the attribute buffer 409 and sets this information in the register of the identification-information generating circuit 406. The CPU 301 then analyzes this information, generates identification information which identifies the apparatus that generated the print information and the apparatus that prints the image and outputs the identification information from the identification-information generating circuit 406 to the print-data conversion circuit 407.

Accordingly, when the printing position of the printhead 306 has reached the predetermined position, the print data and identification information enter the print-data conversion circuit 407 and, on the basis of this identification information, the print data is converted to print data, to which the identification information has been added, that will be output to the printhead. This conversion is performed by addition of information onto the print data, changing of the print data and deletion of the print data, etc.

The print data resulting from the conversion is stored in the print buffer 408. It should be noted that the add-on of the identification information is performed with regard to print data of the yellow component, which is difficult for the human eye to perceive. In actuality, the identification information becomes an encrypted pattern.

Figure 7:
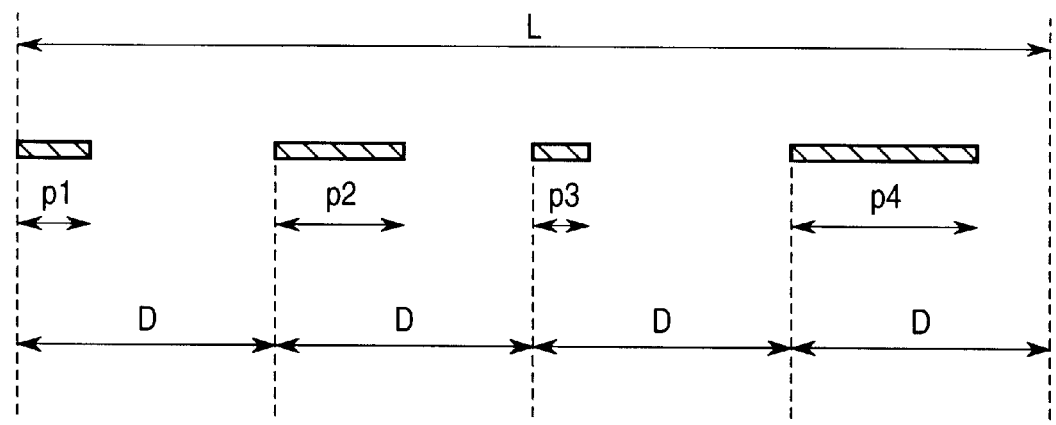
FIG. 7 is a diagram showing a specific example of identification information added to a print image.

FIG. 7 is a diagram showing a specific example of identification information added onto a print image.

As shown in FIG. 7, the add-on of the identification information is performed in such a manner that patterns p1, p2, p3, p4 of different lengths are printed on the printing paper at equal intervals D over a predetermined width L. By predetermining L, D, p1, p2, p3 and p4, a large quantity of information can be reproduced from combinations of these lengths.

Lastly, at step S609 in FIG. 6, the print data is output from the print buffer 408 to the printhead 306 and is actually printed on the printing medium.

Figure 8:
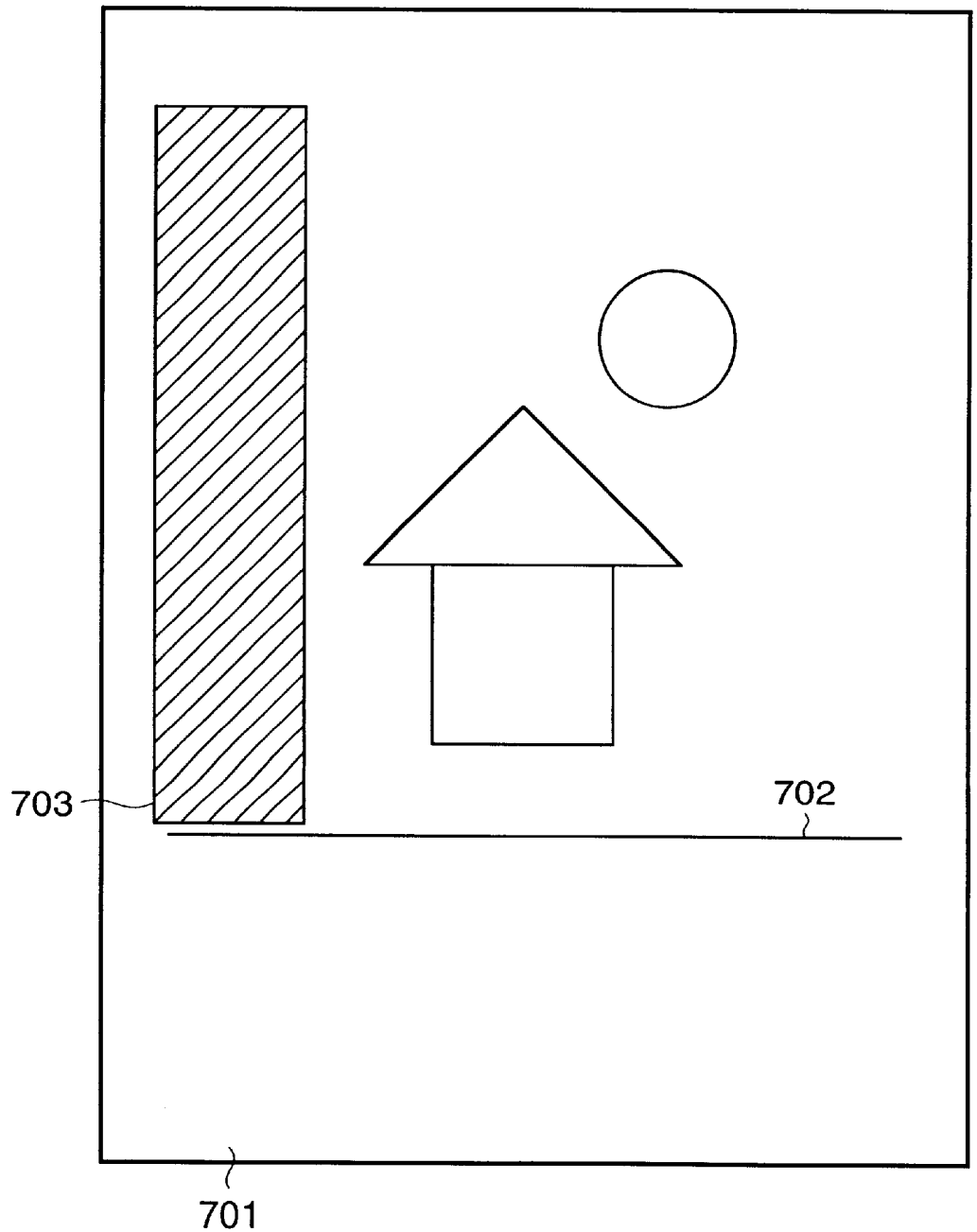
FIG. 8 is a diagram showing an example of a printed image.

FIG. 8 is a diagram showing an example of a printed image. Numerals 701, 702 and 703 denote a blank portion, a black line and a black area, respectively. It should be noted that the encrypted pattern representing identification information is placed in such portions as the blank portion 701 of the printing paper. After the processing of step S609, control returns to step S601, where the system waits for receipt of the next item of print information.

Thus, in accordance with the embodiment described above, identification information specifying information such as an apparatus that generated and/or printed image data can be added on as an encrypted pattern whenever a predetermined position on a printing medium such as printing paper is arrived at during the printing of an image with a yellow component that is difficult for the human eye to perceive.

Thus, it is easy to determine from the formed image the apparatus or individual that formed the image. This contributes to the prevention of counterfeiting and unauthorized duplication.

Figure 9:
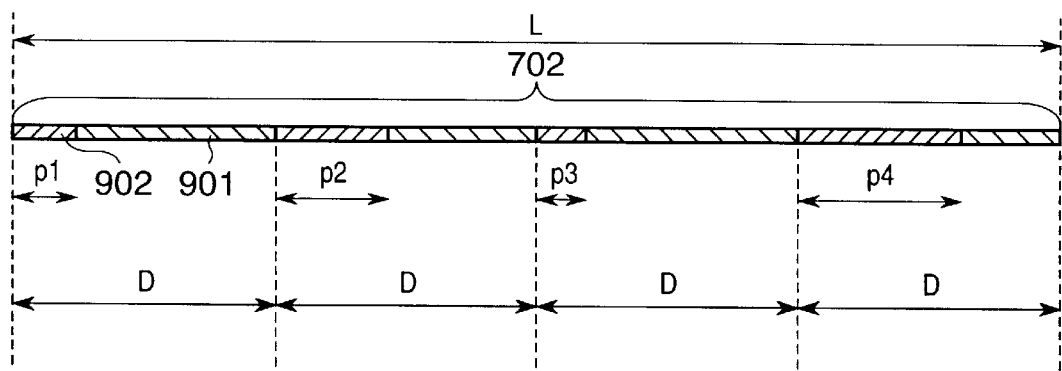

It should be noted that the position at which the pattern of identification information is added on is not limited to the blank portion of the printing paper mentioned above. For example, an arrangement may be adopted in which the printing of the black line 702 shown in FIG. 8 forms the pattern of identification information. In such case, as shown in FIG. 9, line segments 901 of the pattern of identification information are printed in the black line 702 by discharging black ink from the Bk head 306a, and portions 902 corresponding to p1, p2, p3 and p4 are printed in the black line 702 by process black, which is produced by combining cyan ink, magenta ink and yellow ink discharged from the C head 306b, M head 306c and Y head 306d, respectively.

Figure 10:
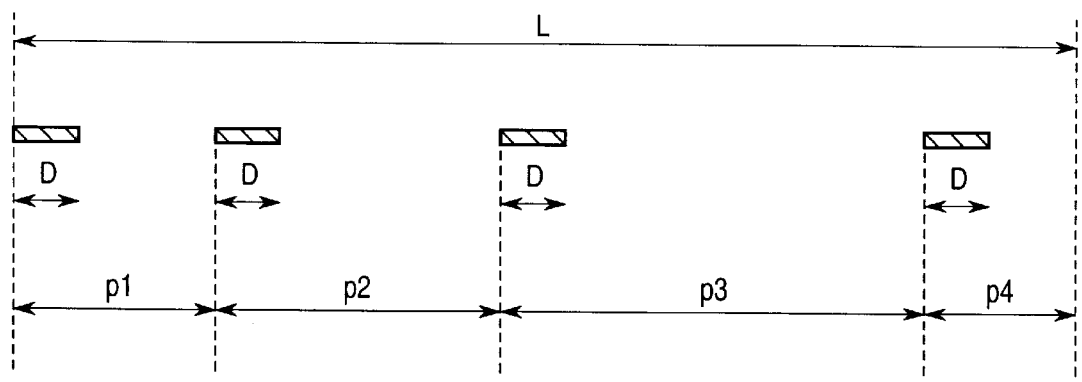
FIG. 10 is a diagram showing a different example of a method of expressing identification information.

Further, the identification information defined by the pattern need not be expressed by the pattern of different lengths p1, p2, p3 and p4 of equal intervals shown in FIG. 7. For example, as illustrated in FIG. 10, the pattern may be expressed by changing, to p1, p2 p3, p4, the intervals of the positions at which a pattern of a predetermined length (D) is printed.

Figure 11:
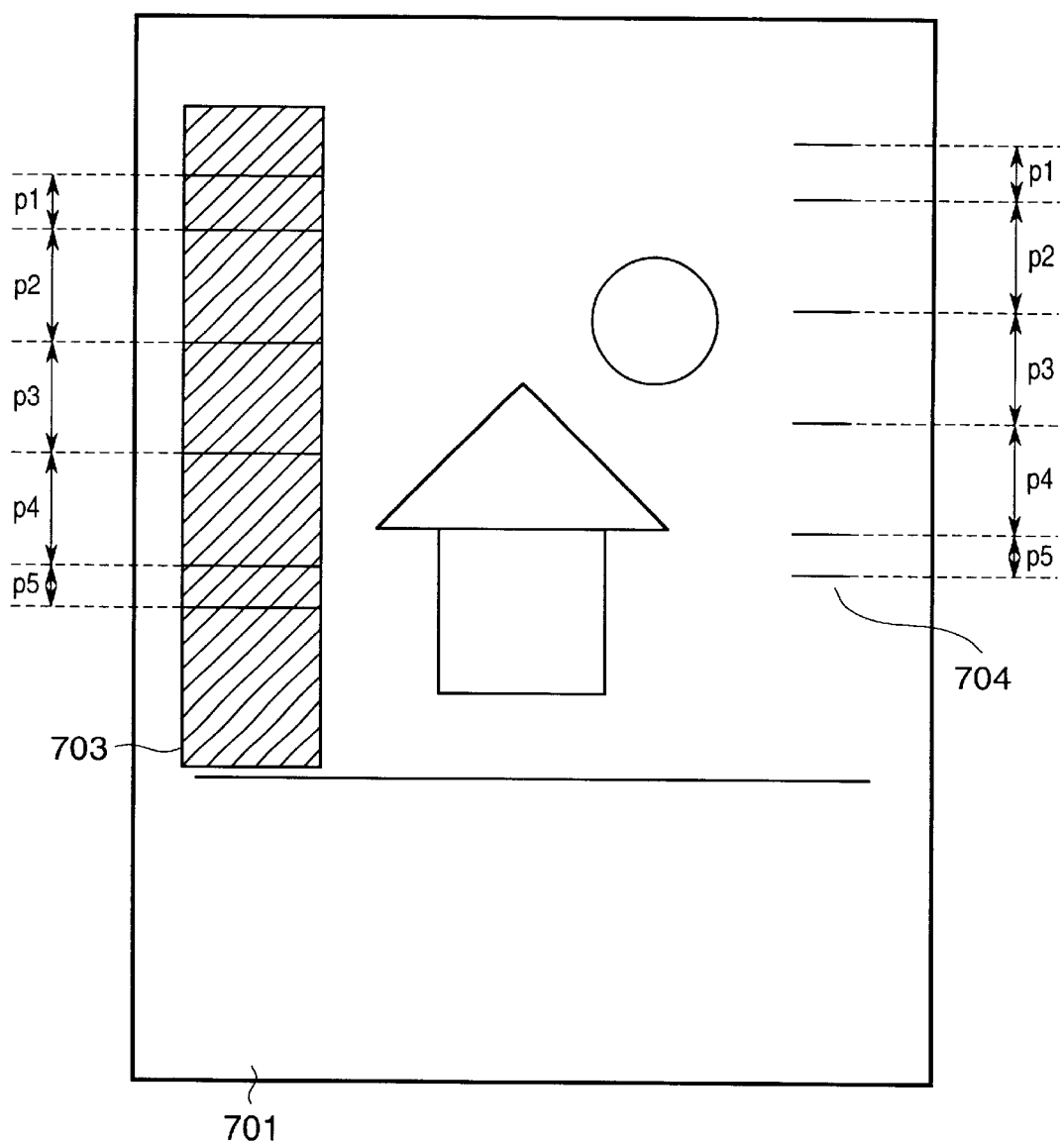

Furthermore, in addition to the arrangements described above, the pattern of identification information may be added to a blank portion 704 extending in the conveyance direction of the printing medium, as shown in FIG. 11, or to a portion 703 of uniform density extending in the conveyance direction.

The embodiment described above relates to a case where color printing is carried out using inks of the four colors black, cyan, magenta and yellow. In this embodiment, however, there will be described an example in which a special-purpose printhead is provided for discharging processed liquid (a water repellency enhancing agent) onto the printing medium in order to enhance the fixation and water repellency of the image printed on the printing medium and to improve the quality of the image. This processed liquid is used in addition to the four inks mentioned above.

Figure 12:
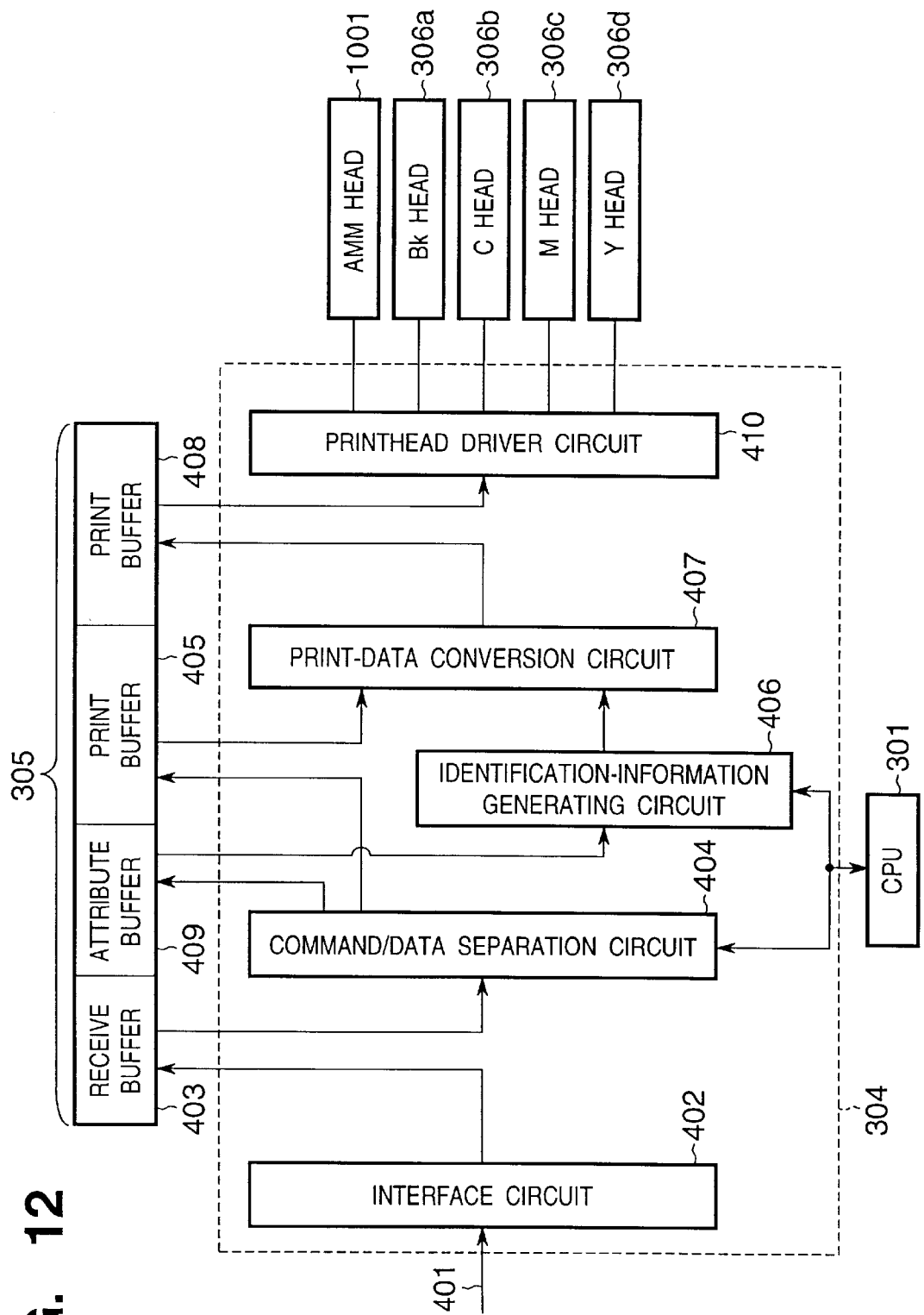
FIG. 12 is a block diagram schematically illustrating the flow of print information processing executed by the printer 102, which has a printhead (AMM head) for discharging processed liquid.

FIG. 12 is a block diagram schematically illustrating the flow of print information processing executed by the printer 102, which has a printhead (AMM head) 1001 for discharging the processed liquid. Components in FIG. 12 identical with those described in conjunction with FIG. 4 are designated by like reference characters and need not be described again.

Figure 13:
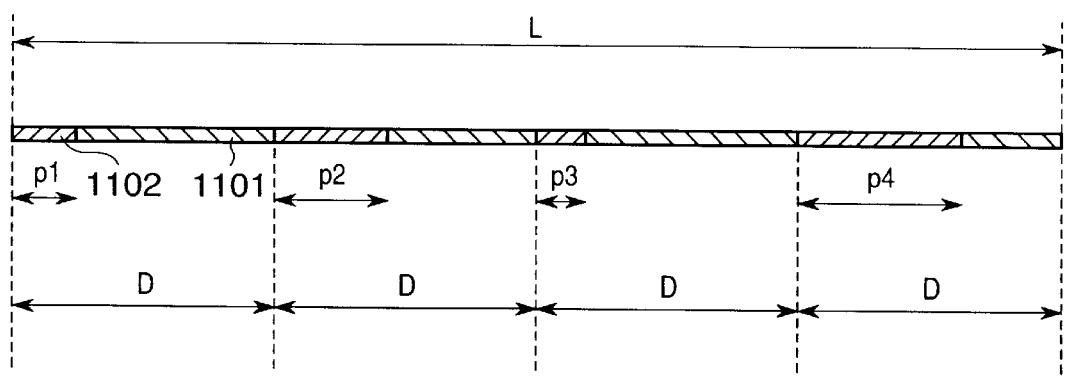
FIG. 13 is a diagram showing an example of a pattern indicating identification information printed by the printer, which executes the processing shown in FIG. 12, using processed liquid and ink.

FIG. 13 is a diagram showing an example of a pattern indicating identification information printed by the printer, which executes the processing shown in FIG. 12, using the processed liquid and ink.

Numerals 1101 and 1102 in FIG. 13 denote a portion to which the processed liquid serving as the water repellency enhancing agent has been added and a portion to which the processed liquid has intentionally not been added, respectively.

Thus, in accordance with this embodiment, performing printing in the manner described makes it possible to verify identification information by ascertaining the local difference in water repellency relative to the printing image.

In the embodiments set forth above, it is described that an image that is the target of counterfeiting is input from a scanner or external storage device such as an magneto-optical disk or from a network. However, the present invention is not limited to such input means. For example, an image may be input using other input means such as an IC card, and the image may be generated within the computer by employing computer graphics technology. In a case where image data is generated internally in this fashion, the source of image generation is identified by sending the printer the registration ID of the application used in image generation.

Further, in the embodiments described above, the attribute buffer is reserved in the RAM. However, as long as it is possible to retain data temporarily, the attribute buffer may be implemented by another memory or by a register.

Furthermore, in the embodiments described above, a case in which color printing is performed using inks of four colors is described. However, this does not impose a limitation upon the present invention. For example, the present invention is applicable to printers which use inks of the same color, namely printers which use toned inks of different densities or to printers which use special ink such as fluorescent ink.

Further, in the embodiments set forth above, a printer that prints in accordance with an ink-jet technique is used. However, this does not impose a limitation upon the present invention. For example, it goes without saying that the present invention is applicable to printers that print in accordance with other printing methods, such as the electrophotographic method or thermal-transfer method.

However, the embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only a cartridge type printhead in which an ink tank is integrally arranged on the printhead itself but also an exchangeable chip type printhead, as described in the above embodiment, which can be electrically connected to the apparatus main unit and can receive an ink from the apparatus main unit upon being mounted on the apparatus main unit can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A printing system having a generating apparatus for generating image data and a forming apparatus for forming an image based upon the image data, said system comprising:

input means for inputting the image data outputted from said generating apparatus;

acquisition means for acquiring attribute information relating to said generating apparatus and said forming apparatus;

identification-information generating means for generating identification information, which identifies said generating apparatus and said forming apparatus, based upon the attribute information;

adding means for adding the image data to the identification information; and output means for outputting the image data, to which the identification information has been added by said adding means, to said forming apparatus, wherein said forming apparatus includes a printhead for discharging ink and for discharging processed liquid for enhancing water repellency of an image formed by the ink, and forms a pattern representing the identification information by using the processed liquid.

2. The system according to claim 1, wherein said generating apparatus comprises at least one of:

an image input unit for reading an image original;

an external information processing unit connected by a network;

a host computer for generating the image data by executing software; and a large-capacity information storage device for storing the image data.

3. The system according to claim 2, wherein the network includes a LAN and a public communication line.

4. The system according to claim 2, further comprising communication means for communicating with the network.

5. The system according to claim 1, wherein said printhead includes:

a first head for discharging black ink;

a second head for discharging cyan ink;

a third head for discharging magenta ink; and a fourth head for discharging yellow ink.

6. The system according to claim 5, wherein when printing is performed by said fourth head, said output means outputs the image data, to which the identification information has been added by said adding means, to said forming apparatus.

7. The system according to claim 1, wherein said adding means adds a pattern, which has been obtained by encrypting the identification information, to the image data on the basis of the identification information.

8. The system according to claim 1, wherein on the basis of the image data to which the identification information output by said output means has been added, said generating apparatus prints a pattern that represents this identification information at a predetermined position on a printing medium.

9. The system according to claim 1, wherein said acquisition means includes storage means for temporarily storing the attribute information.

10. The system according to claim 1, wherein the attribute information is a manufacturer's serial number of said generating apparatus and a manufacturer's serial number of said forming apparatus.

11. The system according to claim 1, wherein the attribute information is registration number of software used in the printing system.

12. The system according to claim 1, wherein the attribute information is an identification number of a system user.

13. A printing apparatus for printing an image on a printing medium based upon image data that is inputted from a generating apparatus which generates the image data, said apparatus comprising:

acquisition means for acquiring attribute information relating to said generating apparatus and said printing apparatus;

identification-information generating means for generating identification information, which identifies said generating apparatus and said printing apparatus, based upon the attribute information;

adding means for adding the image data to the identification information; and printing means for printing an image on the printing medium based upon the image data to which the identification information has been added by said adding means, wherein said printing means includes a printhead for discharging ink and for discharging processed liquid for enhancing water repellency of an image printed by the ink, and prints a pattern representing the identification information by using the processed liquid.

14. The apparatus according to claim 13, wherein said generating apparatus comprises at least one of:

an image input unit for reading an image original;

an external information processing unit connected by a network;

a host computer for generating the image data by executing software; and a large-capacity information storage device for storing the image data.

15. The apparatus according to claim 14, wherein the network includes a LAN and a public communication line.

16. The apparatus according to claim 14, further comprising communication means for communicating with the network.

17. The apparatus according to claim 14, wherein the attribute information is registration number of software used in the host computer.

18. The apparatus according to claim 13, wherein said printhead includes:

a first head for discharging black ink;

a second head for discharging cyan ink;

a third head for discharging magenta ink; and a fourth head for discharging yellow ink.

19. The apparatus according to claim 18, wherein when printing is performed by said fourth head, said printing means prints based upon the image data to which the identification information has been added by said adding means.

20. The apparatus according to claim 13, wherein said adding means adds a pattern, which has been obtained by encrypting the identification information, to the image data on the basis of the identification information.

21. The apparatus according to claim 13, wherein on the basis of the image data to which the identification information has been added, said printing means prints a pattern that represents this identification information at a predetermined position on a printing medium.

22. The apparatus according to claim 13, wherein said acquisition means includes storage means for temporarily storing the attribute information.

23. The apparatus according to claim 13, wherein the attribute information is a manufacturer's serial number of said generating apparatus and a manufacturer's serial number of said printing apparatus.

24. The apparatus according to claim 13, wherein the attribute information is an identification number of a user of said printing apparatus and said generating apparatus.

25. An apparatus identifying method for identifying a generating apparatus which generates image data and a forming apparatus which forms an image based upon the image data, said method comprising:

an input step of inputting the image data outputted from said generating apparatus;

an acquisition step of acquiring attribute information relating to said generating apparatus and said forming apparatus;

an identification-information generating step of generating identification information, which identifies said generating apparatus and said forming apparatus, based upon the attribute information;

an adding step of adding the image data to the identification information;

an output step of outputting the image data, to which the identification information has been added at said adding step, to said forming apparatus; and a printing step of printing an image on a printing medium based upon the image data outputted from said output step, wherein said printing step prints a pattern representing the identification information using processed liquid for enhancing water repellency of an image printed by ink.

26. The method according to claim 25, wherein said generating apparatus comprises at least one of:

an image input unit for reading an image original;

an external information processing unit connected by a network;

a host computer for generating the image data by executing software; and a large-capacity information storage device for storing the image data.

27. The method according to claim 26, wherein the attribute information is registration number of software used in the host computer.

28. The method according to claim 25, wherein said adding step adds a pattern, which has been obtained by encrypting the identification information, to the image data on the basis of the identification information.

29. The method according to claim 25, wherein the attribute information is a manufacturer's serial number of said generating apparatus and a manufacturer's serial number of said forming apparatus.

30. The method according to claim 25, wherein the attribute information is an identification number of a system user.

31. A computer program product, stored in a computer-readable storage medium, to be executed in a computer for identifying a generating apparatus which generates an image and a forming apparatus which forms an image based upon the image data, said product comprising:

code for executing processing for inputting the image data outputted from said generating apparatus;

code for executing processing for acquiring attribute information relating to said generating apparatus and said forming apparatus;

code for executing processing for generating identification information, which identifies said generating apparatus and said forming apparatus, based upon the attribute information;

code for executing processing for adding the image data to the identification information; code for executing processing for outputting the image data, to which the identification information has been added by said adding processing, to said forming apparatus; and code for executing processing for causing said forming apparatus to print an image on a printing medium based upon the image data to which the identification information has been added, wherein a pattern representing the identification information printed based on the code for executing processing for causing said forming apparatus to print is printed by using processed liquid for enhancing water repellency of an image printed by ink.

* * * * *

UNITED STATES PATENT AND TRADEMARK OFFICE
CERTIFICATE OF CORRECTION

PATENT NO. : 6,646,764 B1
DATED : November 11, 2003
INVENTOR(S) : Wataya

It is certified that error appears in the above-identified patent and that said Letters Patent is hereby corrected as shown below:

Column 2,
Line 28, "According," should read -- Accordingly, --.

Column 6,
Line 46, "303;," should read -- 303; --.

Column 11,
Line 40, "full line" should read -- full-line --.

Column 12,
Line 11, "use" should be deleted.

Signed and Sealed this

Twenty-fifth Day of May, 2004

JON W. DUDAS
*Acting Director of the United States Patent and Trademark Office*